(12) United States Patent
Holcomb et al.

(10) Patent No.: US 7,210,643 B2
(45) Date of Patent: *May 1, 2007

(54) MULTIPLE CHAMBER CONDIMENT GRINDER

(75) Inventors: David A. Holcomb, Seattle, WA (US); Peter A. Ryding, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/130,434

(22) Filed: May 16, 2005

(65) Prior Publication Data

US 2006/0049292 A1    Mar. 9, 2006

Related U.S. Application Data

(63) Continuation of application No. 10/606,280, filed on Jun. 25, 2003, now Pat. No. 6,926,214, which is a continuation of application No. 10/345,054, filed on Jan. 15, 2003, now abandoned, which is a continuation of application No. 09/656,498, filed on Sep. 7, 2000, now Pat. No. 6,672,524.

(51) Int. Cl.
*A47J 42/32* (2006.01)
(52) U.S. Cl. ..................................... 241/169
(58) Field of Classification Search ............ 241/169.1, 241/169, 101.3, 101.2
See application file for complete search history.

(56) References Cited

U.S. PATENT DOCUMENTS

| | | | |
|---|---|---|---|
| 95,135 A | 9/1869 | Petrie | |
| 265,819 A | 10/1882 | Johnston | |
| 1,264,134 A | 4/1918 | Quick | |
| 1,588,552 A | 6/1926 | Sprinkle | |
| 1,692,162 A | 11/1928 | Exsternbrink | |
| 3,827,641 A | 8/1974 | Andersson | |
| 4,573,244 A | 3/1986 | Holcomb et al. | |
| 4,632,322 A | 12/1986 | Beilstein | |
| 4,685,627 A | 8/1987 | Lee | |
| 4,697,749 A | 10/1987 | Holcomb et al. | |
| 4,709,865 A | 12/1987 | Bounds | |
| 4,844,352 A | 7/1989 | Griffin | |
| 5,148,995 A | 9/1992 | Hurst | |
| 5,269,475 A | 12/1993 | Diefenbach | |
| 5,531,389 A | 7/1996 | Husted | |
| 5,651,506 A | 7/1997 | Hockey | |
| 5,730,374 A | 3/1998 | Wu | |
| 5,988,543 A | 11/1999 | Wu | |

FOREIGN PATENT DOCUMENTS

| | | |
|---|---|---|
| BE | 407 369 A | 2/1935 |
| GB | 2 355 946 A | 5/2001 |
| WO | WO 00/28870 | 5/2000 |

*Primary Examiner*—Mark Rosenbaum
(74) *Attorney, Agent, or Firm*—Seed IP Law Group PLLC

(57) ABSTRACT

A dual chamber condiment grinder has more than one chamber for holding a different condiment in each, and each chamber has a rasp that can be selectively moved up and down to grind the condiment in the associated chamber. An actuating handle rotates on the top of the chambers to position a cam over one or the other of the rasps to selectively grind the contents of one of the chambers. In the alternative, the cam can move in a slot in a movable handle to position the cam over the desired rasp.

3 Claims, 5 Drawing Sheets

MULTIPLE CHAMBER CONDIMENT GRINDER

CROSS-REFERENCES TO RELATED APPLICATIONS

This application is a continuation of U.S. patent application Ser. No. 10/606,280, filed Jun. 25, 2003, now U.S. Pat. No. 6,926,214, which is a continuation of Ser. No. 10/345,054, filed Jan. 15, 2003, now abandoned, which is a continuation of 09/656,498, filed Sep. 7, 2000, now U.S. Pat. No. 6,672,524. These applications are incorporated herein by reference in their entireties.

BACKGROUND OF THE INVENTION

1. Field of the Invention

This invention relates to hand-held condiment grinders that include multiple chambers and a grinding actuating mechanism that will selectively actuate a grinder mechanism for each chamber.

2. Description of the Related Art

Hand-held condiment grinders are known. These grinders usually have a single chamber for holding only one condiment at a time, such as, peppercorns, salt, seeds or the like. One grinder of this type is shown in U.S. Pat. Nos. 4,697,749 and 4,573,244. Some grinders have more than one chamber to hold more than one condiment at the same time but these multiple chamber grinders require more complicated, separately actuated grinding mechanisms, each fully separate from the other so that two different grinding mechanisms and actuating mechanisms for those grinding mechanisms are required.

BRIEF SUMMARY OF THE INVENTION

This invention is a multiple chamber condiment grinder, preferably having two separate chambers, but in which a common grinding actuating mechanism is used by being selectively positioned over each chamber. In one embodiment, the grinding actuating mechanism is rotatably mounted to be rotated selectively over one or the other of the separate chambers. In another embodiment, a cam is moved to be selectively positioned over one or the other of the separate chambers. Other variations of the selective actuation of the grinding mechanism may also be employed.

DETAILED DESCRIPTION OF THE INVENTION

Figure 1:
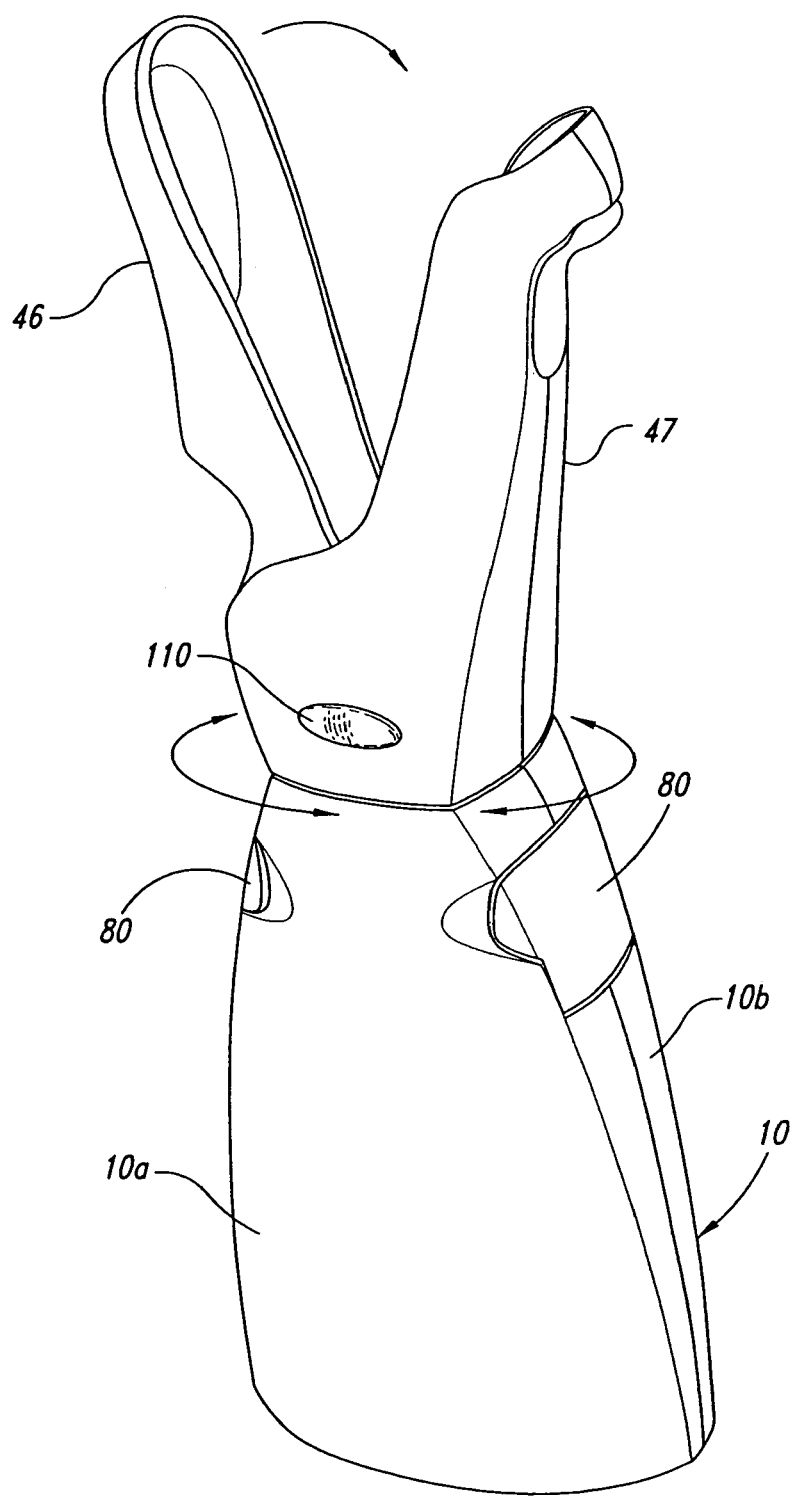
FIG. 1 is a perspective view of the grinder.
Figure 2:
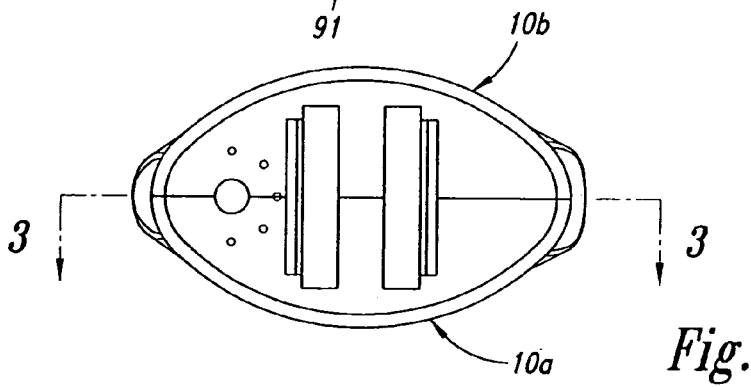
FIG. 2 is a bottom view with parts broken away for clarity.
Figure 6:
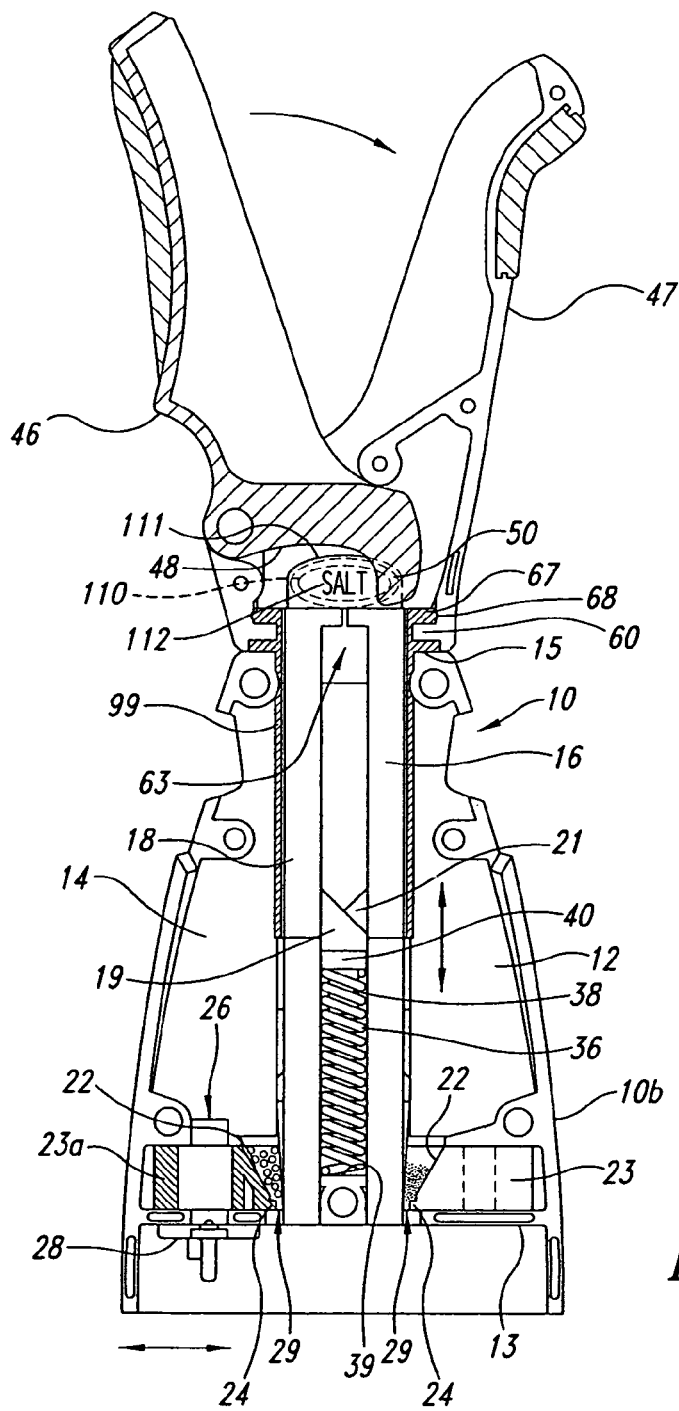
FIG. 6 is a longitudinal section taken along the line 6—6 of FIG. 5.
Figure 7C:
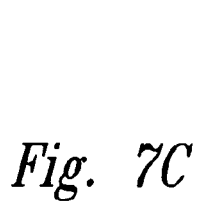
FIG. 7C is a top view of the rasp.
Figure 8C:
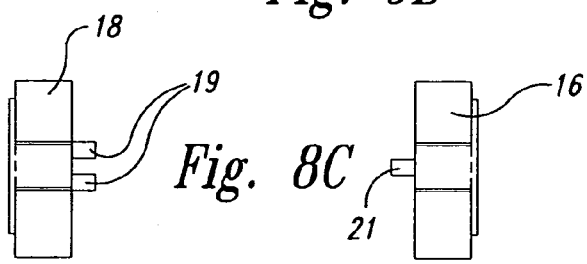
FIG. 8C is a top view of the rasp.
Figure 7A:
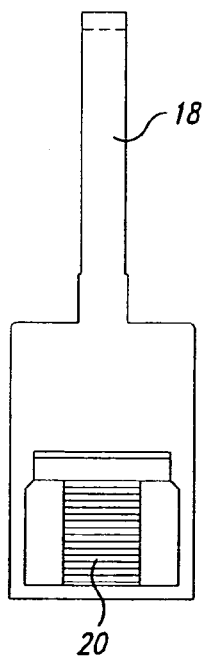
FIG. 7A is a front view of the rasp 18 forming part of the grinder.
Figure 8B:
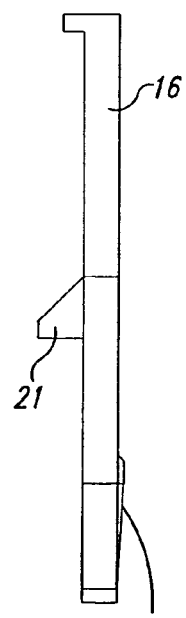
FIG. 8B is a side elevation thereof.
Figure 8A:
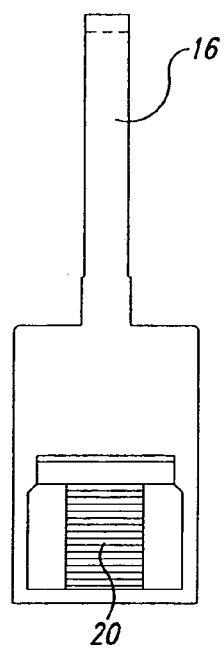
FIG. 8A is a front view of the rasp 16 forming part of the invention.

As best shown in FIGS. 1, 2 and 6, the grinder includes a housing 10 formed from two joined halves 10a and 10b and having at least two chambers 12, 14. For the purpose of this invention it will be understood that two chambers will be used, however, more than two chambers are also possible. A first chamber 12 (FIG. 6) may hold one condiment, such as, salt. A second chamber 14 may hold a second condiment, such as, peppercorns. Each chamber has a lower wall 13 and an upper wall 15. A first rasp 16 is positioned in the first chamber 12 and a second rasp 18 is positioned in the second chamber 14. Each rasp 16, 18 has teeth or spaced grinding edges 20 (FIGS. 7A and 8A) that are spaced from a shear block 23 and 23a mounted in the bottom wall of chambers 12 and 14, respectively.

Figure 5:
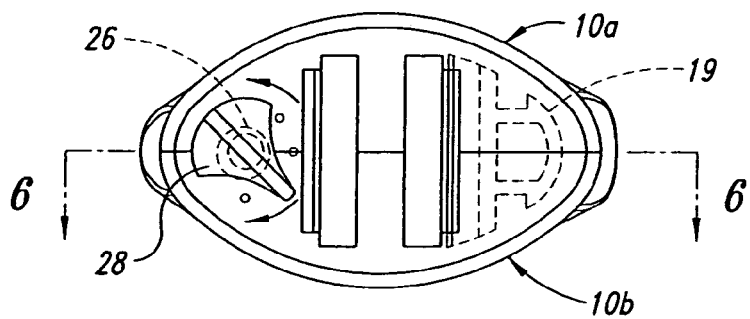
FIG. 5 is a bottom view of the grinder.

Each of the shear blocks 23, 23a has a ramp 22 and a shearing edge 24, although other forms of a shearing surface are also contemplated. The shearing blocks can both be adjustably spaced from the teeth 20 of the rasp to control the size of the ground particles. The space between each of the rasps 16, 18 and the associated shearing edge 24 defines a discharge gap 29 for discharging ground condiment. In the alternative, the shearing blocks 23, 23a for each chamber 12, 14 can be fixed to not adjust the size of the ground condiment. In the embodiment shown in the drawing, particularly FIGS. 5 and 6, one of the shear blocks 23a is made adjustable by an eccentric pin 26 that can be rotated by a knob 28. Rotation of the knob 28 will cause the shear block 23a to move toward or away from the rasp 18 to change the width of gap 29 between the block 23a and the rasp 18 and thus control the size of the ground condiment. This is particularly desirable for peppercorns as users often have different preferences for the size of the ground pepper.

Figure 7B:
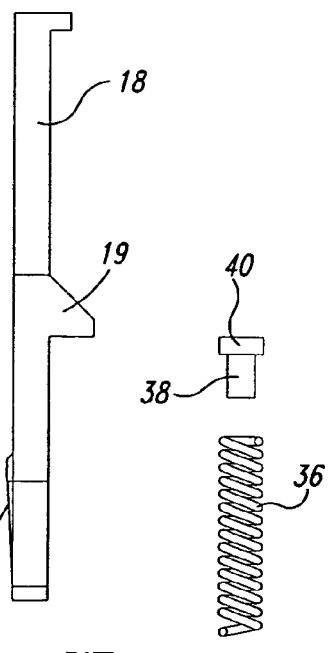
FIG. 7B is a side elevation thereof.
Figure 7D:
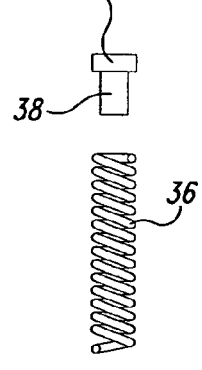
FIG. 7D is an exploded view of a return spring for actuation of the rasp.

The rasps 16 and 18 extend up through the top wall 15 of the chambers 12, 14 and are spaced from one another, as shown in FIG. 6. One rasp 18 has a fork with arms 19 (FIGS. 7B and 7C) forming a space therebetween and extending out toward the other rasp 16. The other rasp 16 has a tongue 21 (FIGS. 8A and 8C) extending out therefrom and positioned in the space between the arms 19 of the fork. Both the arms 19 and the tongue 21 lie over a spring chamber. As best seen in FIGS. 6 and 7D, a spring 36 is positioned on a pin 38 having a flat enlarged cap 40. The bottom of the spring rests on a boss 39. As can be readily seen, if rasp 18 with the fork is moved downwardly, the spring 36 can be depressed without effecting the rasp 16 with the tongue 21 and vice versa. Thus, the rasps 16, 18 can be selectively actuated to grind the condiment in one chamber 12, 14 or the other.

The tops of the rasps 16, 18 extend up through the top wall 15 of the chambers 12, 14 and are engageable by a cam 50. The cam 50 may be formed on the end of an arm 48 formed on a movable handle 46. In this embodiment a second handle 47 is provided. The handles have a circular flange 60 (FIG. 3) that rides in a circular groove 62 formed in a collar 63 attached to the top walls of the chambers. In a preferred embodiment, the collar 63 is made of Delrin®, a hard and low friction form of plastic, or other plastic or metal. In the illustrated embodiment, the handles are rotated 180 degrees to selectively position the cam 48 over either the rasp 16 or the rasp 18. Thus, if the cam 50 is positioned over the rasp 16, for example, movement of the movable handle 46 toward the opposite handle 47 will move the cam 50 downwardly, thus pushing the rasp 16 only downwardly to grind the condiment in that chamber 12. The rasp 18 of the other chamber 14 will not be moved. By rotating the handles 46, 47 in the circular groove 62 to the opposite position, the cam 50 will actuate only the rasp 18.

Figure 4:
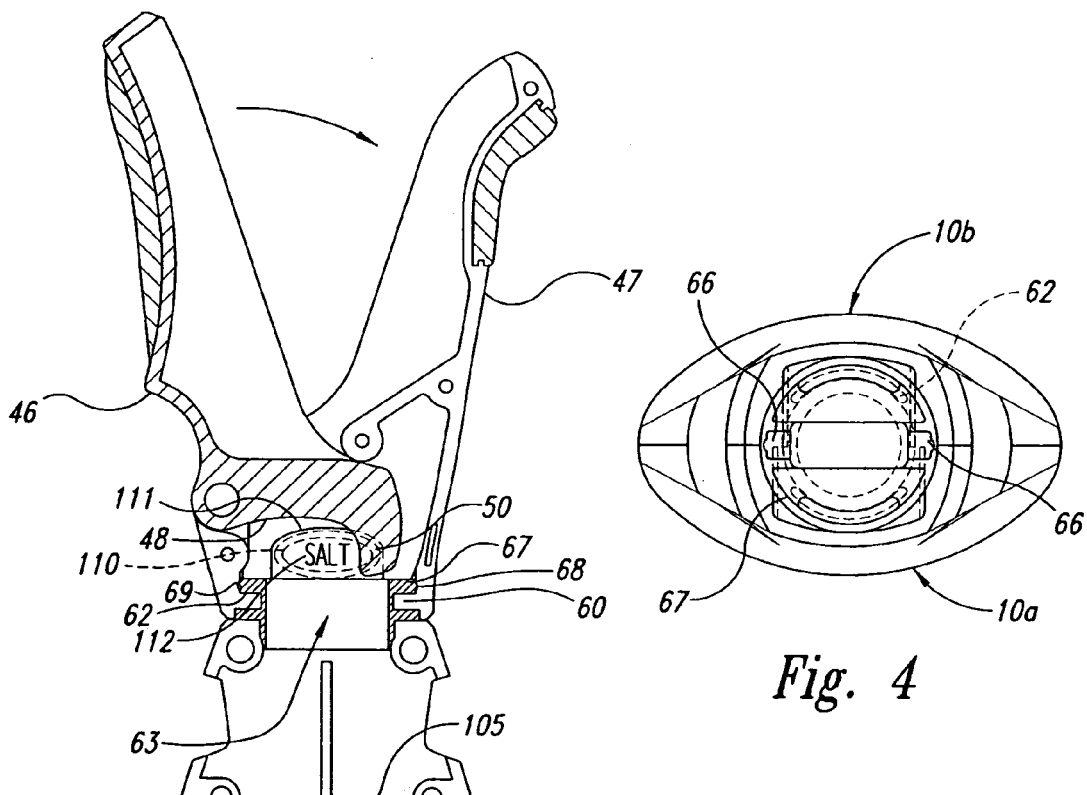
FIG. 4 is a top view of the housing with the handles and internal parts removed for clarity.

In a preferred embodiment, detents 66 (FIG. 4), spaced 180 degrees from each other, are formed on the top flange 67 of the collar 63. Mating indents 68 are formed 180 degrees apart in a groove 69 in the handles. As the handles are turned about the longitudinal axis of the housing, their indents move from one detent position, engaging detents 66, to the other detent position, again engaging detents 66, after 180 degrees of rotation. The indents 68 and mating detents 66 releasably hold the handles in one of their two operating positions while the grinder is being used.

Figure 3:
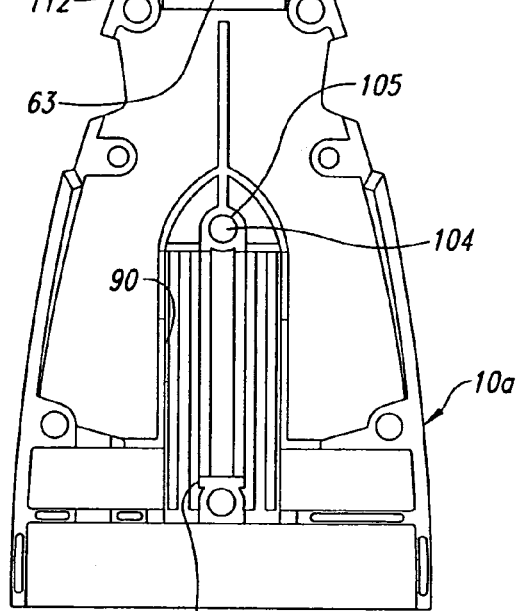
FIG. 3 is a longitudinal section taken along the line 3—3 of FIG. 2.

As best seen in FIGS. 1, 3 and 6, a transparent window 110 is provided in a bottom region of handle 47. As best seen in FIGS. 3 and 6, collar 63 is provided with a protrusion 111 extending upward from an upper region of collar 63. In a preferred embodiment, the name 112 of a first condiment is provided on one side of the protrusion, and the name of a second condiment (not shown) is provided on the opposite side of the protrusion, such that the two names are circumferentially spaced on the protrusion by 180 degrees. The protrusion 111 is aligned with the window 110 of the handle, such that the name of the condiment is visible through the window 110, and corresponds to the condiment that will be ground given the position of the handle. When the handles are rotated 180 degrees to the alternative operating position, the window 112 is then aligned with the name of the second condiment, corresponding to the condiment in the second chamber. In this manner, a user may simply look at the window 110 to determine the position of the handle and hence which condiment will be ground when the handle 46 is actuated. It will be understood that the names of any two condiments may be provided on the protrusion 111 of collar 63, although in a preferred embodiment, the collar 63 is marked with the words "salt" and "pepper." If desired, a second window (not shown) may be provided on the handle 47 opposite window 110 to continuously display a desired element, for example, a company logo.

Figure 9C:
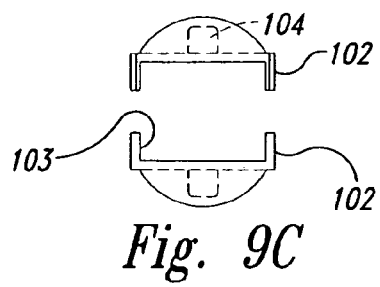
FIG. 9C is an exploded top view thereof.
Figure 9A:
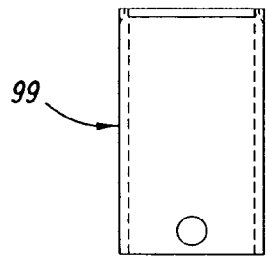
FIG. 9A is a front view of a rasp retaining sleeve forming part of the invention.
Figure 9B:
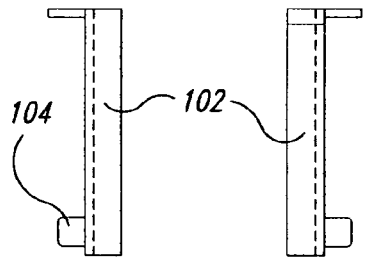
FIG. 9B is an exploded side elevation thereof.

Each rasp is guided in the housing by flanges 90 and 91 (FIG. 3). The tops of the rasps are guided by a rectangular sleeve 99 (FIG. 6), and shown in exploded view in FIGS. 9A–9C. The sleeve is formed of two parts 102 having guide walls 103 for slidably retaining the rasps when the sleeve is attached within the housing. Alternatively, the sleeve 99 may be formed as an integral piece. Receptacles 105 in the housings for pins 104 position the sleeve in fixed position in the housing 10.

Figure 11:
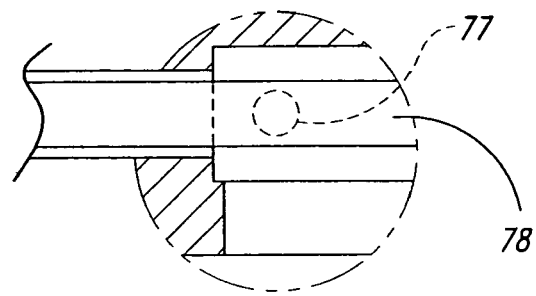
FIG. 11 is a fragmentary detail of the embodiment of FIG. 10.
Figure 10:
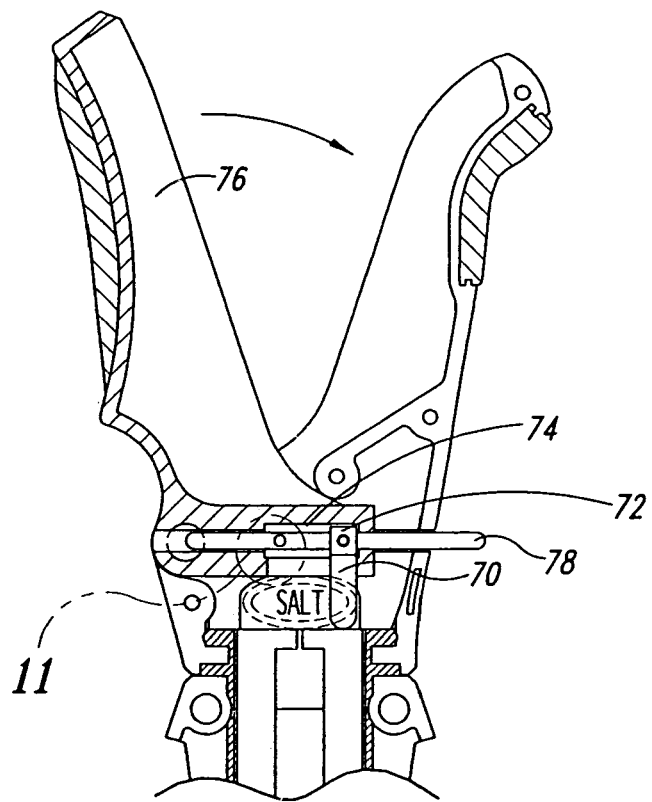
FIG. 10 is a fragmentary view of another embodiment of the invention.

In another embodiment, as shown in FIGS. 10 and 11, a cam 70 is attached to a square pin 72 that rides in a slot 74 of a movable handle 76. An adjustment rod 78 passes into the handle and is attached to the pin 72. The pin 72 is conventional of two pieces with a spring pushing them apart in a conventional manner as a detent. The ends of the pin 72 are rounded to fit into two detents or dimple positions 77 at opposite ends of the slot 74 to selectively provide for positioning the cam over one or the other of the rasps 16 or 18. Thus, the rod 78 can be moved in one direction to position the cam 70 over the rasp in one of the chambers. In the alternative, the rod can be moved in the opposite direction to position the cam over the other rasp in the other chamber. In the same manner as described above, when one of the rasps is moved downwardly by the movement of the moveable handle, the other rasp is unaffected.

As shown in the U.S. Pat. No. 4,697,749, the details of the disclosure of which are incorporated herein by reference thereto, each chamber will be provided with an access door 80 for filling the condiment in that chamber. Also the two halves are aligned by pins on one half with mating holes in the other half and then fused together by sonic welding or any other well known method.

More than one embodiment of the invention is shown and described it being understood that other equivalent embodiments not shown will be apparent to one skilled in the art. Thus, the invention is not to be limited to the embodiments shown in the drawings.

The invention claimed is:

1. A multiple chamber condiment grinder, comprising:
   a housing;
   a first chamber in the housing configured to hold a first condiment to be ground;
   a second chamber in the housing separate from the first chamber and configured to hold a second condiment to be ground;
   a fixed grinding member located in each of the first and second chambers;
   a first movable grinding member positioned in the first chamber and a second movable grinding member positioned in the second chamber, each of the first and second movable grinding members being configured to reciprocatingly translate within the housing with respect to the corresponding fixed grinding member, and each of the first and second movable grinding members having a top region and a shearing edge operatively spaced from the respective fixed grinding member in each chamber defining a discharge gap therebetween and for grinding a condiment between the movable grinding member and the fixed grinding member and discharging the ground condiment through the discharge gap;
   an actuator movably coupled to said housing, said actuator being selectively engageable with one of the first and second movable grinding members and operable to reciprocatingly translate the selected movable grinding member in the chamber and its shearing edges past the corresponding fixed grinding member to grind the condiment in the respective first and second chamber; and
   said actuator being mounted on said housing to be selectively moved from a first position wherein the actuator operatively engages the first movable grinding member to a second position wherein the actuator operatively engages the second movable grinding member, whereby the movable grinding member of each chamber can be selectively actuated for grinding the condiment in that chamber.

2. The grinder of claim 1 wherein the actuator is rotatably mounted on the housing.

3. The grinder of claim 1, further comprising an indicator that displays an identifier for the first condiment when the actuator is in the first position and an identifier for the second condiment when the actuator is in the second position.

* * * * *